Jan. 15, 1952     C. A. SMITH     2,582,289

FISHING REEL

Filed July 5, 1947

INVENTOR
CHARLES A. SMITH
BY
Charles S. Penfold
ATTORNEY

Patented Jan. 15, 1952

2,582,289

UNITED STATES PATENT OFFICE 2,582,289

FISHING REEL

Charles A. Smith, Bronson, Mich.

Application July 5, 1947, Serial No. 759,074

9 Claims. (Cl. 242—84.5)

This invention is directed to fishing reels.

The majority of fishing reels are comprised of a considerable number of intricate parts or elements which are expensive to manufacture and assemble, and for some purposes or uses an expensive reel is not required.

With this thought in mind one particular object of the invention is to provide a reel embodying improved principles of design and construction, and which is comprised a few parts that can be economically manufactured and rapidly assembled on a production basis.

Another object of the invention is to provide a mounting for the reel, with improved line guiding means movably supported on such mounting.

Another object of the invention is to provide unique locking means for preventing rotation of the reel, such means preferably including abutment means on the mounting and a latch resiliently supported on the reel engageable with the abutment means.

A further object of the invention is to provide means whereby the reel may be attached to a pole in at least two ways.

Other objects of the invention reside in its ability to withstand hard usage over an indefinite period without impairing its efficiency, impossibility of misadjustment, size and quick attachment to a pole or rod, and other advantages, all of which will become evident after considering the description hereinafter set forth in conjunction with the drawing annexed hereto.

In the drawing, Figure 1 is a front view of the reel, embodying the invention, applied to a pole;

Describing the invention more in detail, numeral 1 generally designates a reel rotatably mounted on an axle or spindle 2 carried by a mounting generally designated 3.

Figure 1:
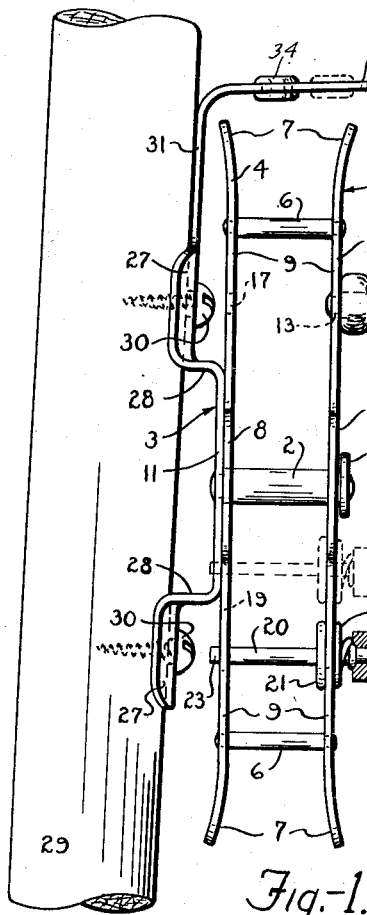
Figure 2:
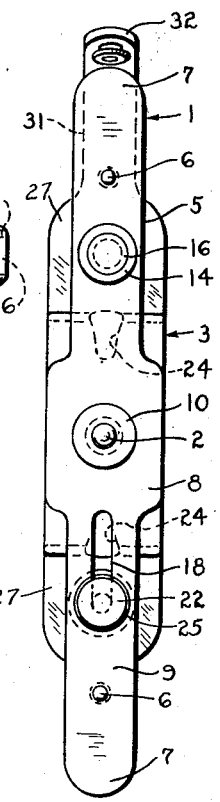
Figure 2 is a side view of the reel.

The reel 1 preferably includes a pair of corresponding longitudinally extending side plates 4 and 5 permanently secured together in parallel relation by identical cross members 6 about which the line is wound. The ends of the side plates are preferably rounded and flared outwardly as indicated at 7 in Figures 1 and 2 so as to assist in piloting the line onto the cross members and prevent the line from catching on such ends when the reel is rotated. The central portion 8 of each plate is preferably made of a width somewhat greater than the relatively narrow extremities 9 in order to impart rigidity to the plates and provide good bearing surfaces for the holding washer 10 secured to the spindle 2 and the base portion 11 of the mounting.

An outward extending pin 12 is permanently secured in a hole 13 provided therefor adjacent one extremity of the plate 5 and rotatably supports a handle 14. The outer end of the handle may be recessed as at 15 to receive the enlarged outer extremity 16 of the pin which holds the handle in place. A hole 17 is provided in the side plate 4 opposite the hole 13, in case it is desired to support the handle pin 12 therein in lieu of hole 13 during assembly.

The opposite extremity 9 of plate 5 is provided with a longitudinal narrow slot 18 and the plate 4 is provided with a slot 19 corresponding to slot 18. A transverse latch 20, of circular cross-section extends through the slots 18 and 19 and is permanently secured to the reel by a washer 21 firmly attached to the latch, preferably by a pressed fit. A relatively small annular handle 22 is also press fitted onto the outer end of the latch for sliding the latch in the slots so that the inner end 23 of the latch may be moved into engagement with either of a pair of openings 24 provided adjacent the extremities of the base portion 11 of the mounting to lock the reel against rotation with respect to such mounting.

Resilient means preferably in the form of a coiled wire compression spring 25, preferably frusto-conical in shape is carried by the latch and is interposed between the latch handle 22 and the outer face of the side plate 5 for normally urging the latch outwardly and maintaining sufficient tension to hold the latch in any transverse position to which it may be adjusted, whether in or out of engagement with the abutments formed by the margins of the openings 24. It is to be noted that the diameter of the base of the spring 25 and the diameter of the washer 21 are approximately the same, the purpose of which is to provide sufficient contact area to maintain the latch normally perpendicular to the planes of the side plates.

Figure 3:
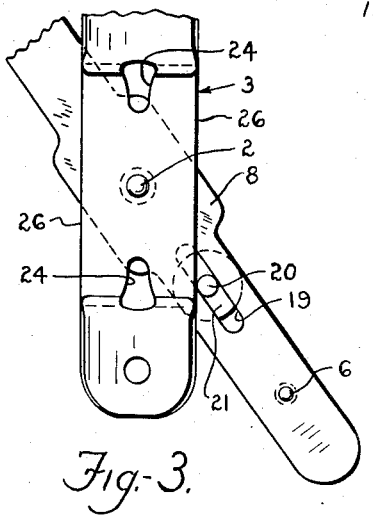
Figure 3 is a partial view of the reel and its mounting exemplifying the fact that the latch will always be automatically returned to an inoperative position if the same should inadvertently engage some portion of the reel other than the abutment means above referred to, when the reel is rotated.
Figure 4:
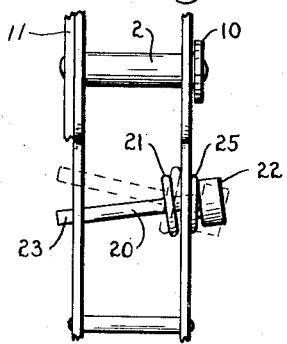
Figure 4 is a partial view of the reel illustrating the manner in which the latch constituting a component part of the locking means is mounted.
Figure 5:
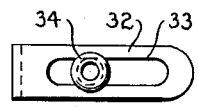
Figure 5 is a partial view of the line guiding means carried by the mounting and operatively related to the reel.

Since the latch is resiliently supported it may pivot as well as slide in the slots 18 and 19 as illustrated in Figure 4, thereby preventing injury to the parts, when for example, the latch inadvertently engages one or the other of the longitudinal marginal edges 26 of the base 11 of the mounting as in Figure 3, in which event, rotation of the reel will cause the latch to ride along such an edge and cam the latch clear of the mounting. The arrangement is such that the latch may be primarily attached to the side plate desired. since the slots 18 and 19 are identical.

The mounting which has been frequently referred to includes a pair of offset pole engaging portions 27 joined to the base portion 11 by portions 28. The portions 27 are preferably curved so as to fit a round pole or rod 29, holes being provided in the portions through which screws 30 may extend to secure the reel assembly to the pole.

One of the offsets is preferably provided with a continuation 31 which terminates in a transverse arm 32 having a slot 33 therein within which a line receiving and guiding member 34 is slidably mounted to direct the line onto the reel.

Figure 6:
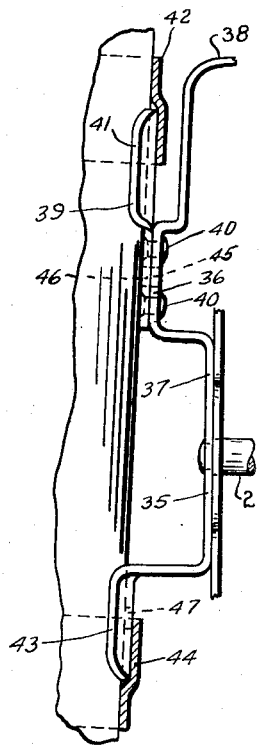
Figure 6 is a modified construction of the invention.

In the modification of the invention exemplified in Figure 6 of the drawing, a mounting 35 is provided, which is similar to the mounting 3, and includes an irregularity 36 joining the base portion 37 with the continuation 38. A fitting 39 is secured to the irregularity 36 by rivets 40. The free end 41 of this fitting is adapted to be caught under a conventional slip ring 42 and the offset 43 under a fixed ferrule 44. An aperture 45 and an aperture 46 is provided in the irregularity and fitting and a hole 47 is provided in the offset, so that if found desirable the reel may be secured in place by screws. This arrangement is advantageous because in some instances it may be desirable to apply the reel to a standard casting pole by the ferrule and ring or to a conventional bamboo pole by screws or the equivalent.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

I claim:

1. An elongated mounting plate adapted to engage a support, a reel rotatively carried by said mounting plate, and integral extension provided on said mounting plate, a slot in said extension, a line guide slidable in said slot, and means movable on the reel adapted to engage the mounting plate for locking the reel against rotation when desired.

2. A mounting bracket for a fishing reel comprising an elongated member having an offset attaching portion at one extremity, an aperture in said offset portion, the other extremity of said member being provided with an arm formed to guide a line onto a reel, a fitting having one end secured to the member and its other end free, and an aperture extending through said member and the secured end of said fitting, said apertures providing means through which fasteners may be extended to attach the mounting bracket to a support, and said offset and the free end of said fitting providing means whereby the mounting bracket may be secured to a support in a different manner.

3. A mounting bracket for a fishing reel comprising an elongated member having an offset attaching portion, an aperture in said offset portion, a fitting having one end secured to the member and its other end free, and an aperture extending through said member and the secured end of said fitting, said apertures providing means through which fasteners may be extended to attach the mounting bracket to a support, and said offset and the free end of said fitting providing means whereby the mounting bracket may be secured to a support in a different manner.

4. In a reel assembly, a bracket having an offset portion formed with a slot, a shaft extending from the bracket, a reel rotatably mounted on the shaft, said reel having elongated openings, a pin slidably mounted in the elongated openings and adapted to extend into the slot of the bracket to hold the reel against rotary movement, and a helical spring surrounding the pin for normally holding the pin against movement.

5. An elongated mounting plate adapted to engage a support, a reel rotatively carried by said mounting plate, an extension provided on said mounting plate and having an offset arm, a slot in said arm, a line guide slidable in said slot, means movable to any one of an infinite number of positions on the reel adapted to engage the mounting plate for locking the reel against rotation when desired, and a spring bearing against the reel and the movable means for automatically holding the movable means in any position to which it may be moved.

6. An elongated mounting plate adapted to engage a support, abutment means provided on the mounting plate, a reel rotatively carried by said mounting plate, said reel including an inner side member and an outer side member secured together in parallel relation, an extension provided on said mounting plate and having an offset arm, a slot in said offset arm, a line guide slidable in said slot, an elongated opening provided in the outer side member, an elongated pin extending transversely through the opening, a stop on the pin located adjacent the inner side of the outer side member, a handle on the outer end of the pin, a spring carried by the pin and located between the handle and outer side member for pressing the stop against the outer side member to maintain the pin in a predetermined position and against accidental displacement, and said pin being movable on the reel so that its inner end can engage the abutment means on the mounting plate for locking the reel against rotation when desired.

7. In a reel assembly, a bracket having an offset portion provided with a slot, a shaft extending from the bracket, a reel rotatably mounted on the shaft, an extension on the bracket, said extension having an arm provided with a slot, a line guide slidable in the slot, said reel having elongated openings, a pin slidably mounted in the elongated openings and adapted to extend into the slot of the bracket to hold the reel against rotary movement, and a helical spring surrounding the pin for normally holding the pin against movement.

8. In a reel assembly, a bracket having an offset portion formed with a slot, a shaft extending from the bracket, a reel rotatably mounted on the shaft, said reel having parallel side plates provided with elongated openings, a cross pin slidably mounted in the elongated openings and adapted to extend into the slot of the bracket, to hold the reel against rotary movement, a stop fixed on the pin and interposed between the side plates, a handle fixed on the pin, and a helical spring surrounding the pin and bearing against the handle and one of the side plates to cause the stop to press against the said one side plate for normally holding the pin in a predetermined position and against accidental movement.

9. In a reel assembly, a bracket having an offset portion formed with a slot, a shaft extending from the offset portion, a reel rotatably mounted on the shaft, said reel including an inner side plate and an outer side plate, an elognated opening provided in each of the side plates, a pin slidably mounted on the outer plate for movement in the elongated openings and adapted to extend into the slot of the bracket to hold the reel against rotary movement, a stop on the pin located between the plates, a handle fixed on the outer end of the pin, a helical spring surrounding the pin and interposed between the handle and the outer plate for pressing the stop against the inner face of the outer plate for normally holding the pin in a predetermined position and against accidental movement, and a handle carried by the outer plate for rotating the reel.

CHARLES A. SMITH.

REFERENCES CITED

The following references are of record in the file of this patent:

UNITED STATES PATENTS

| Number | Name | Date |
|---|---|---|
| 128,137 | Fowler | June 18, 1872 |
| 832,291 | Bryant | Oct. 2, 1906 |
| 1,595,102 | Khoenle | Aug. 10, 1926 |
| 1,621,003 | Dodd | Mar. 15, 1927 |
| 1,827,488 | Roach | Oct. 13, 1931 |
| 2,129,903 | Benson | Sept. 13, 1938 |
| 2,249,433 | Palmer | July 15, 1941 |
| 2,442,670 | Tarasuk | June 1, 1948 |

FOREIGN PATENTS

| Number | Country | Date |
|---|---|---|
| 5,927 of 1932 | Australia | June 23, 1932 |